(12) United States Patent
Favaretto

(10) Patent No.: US 11,975,586 B2
(45) Date of Patent: May 7, 2024

(54) HIGH-PERFORMANCE SPORTS CAR AND CORRESPONDING CONTROL METHOD

(71) Applicant: FERRARI S.p.A., Modena (IT)

(72) Inventor: Fabrizio Favaretto, Formigine (IT)

(73) Assignee: FERRARI S.p.A., Modena (IT)

( * ) Notice: Subject to any disclaimer, the term of this patent is extended or adjusted under 35 U.S.C. 154(b) by 0 days.

(21) Appl. No.: 17/614,589

(22) PCT Filed: May 20, 2021

(86) PCT No.: PCT/IB2021/054384
§ 371 (c)(1),
(2) Date: Nov. 29, 2021

(87) PCT Pub. No.: WO2021/234630
PCT Pub. Date: Nov. 25, 2021

(65) Prior Publication Data
US 2023/0079016 A1    Mar. 16, 2023

(30) Foreign Application Priority Data

May 20, 2020   (IT) ........................ 102020000011707

(51) Int. Cl.
*B60G 17/017* (2006.01)
*B60G 17/052* (2006.01)
*B60S 9/12* (2006.01)

(52) U.S. Cl.
CPC ......... *B60G 17/017* (2013.01); *B60G 17/052* (2013.01); *B60S 9/12* (2013.01); *B60G 2204/47* (2013.01); *B60G 2800/205* (2013.01)

(58) Field of Classification Search
None
See application file for complete search history.

(56) References Cited

U.S. PATENT DOCUMENTS

| 3,064,994 A | 11/1962 | Limmer |
| 6,991,221 B1 | 1/2006 | Rodriguez |

(Continued)

FOREIGN PATENT DOCUMENTS

| FR | 1216104 A | 4/1960 |
| FR | 3014063 A | 6/2015 |
| GB | 964964 A | 7/1964 |

OTHER PUBLICATIONS

International Search Report and Written Opinion dated Sep. 21, 2021 for Application No. PCT/IB2021/054384, 17 pages.

*Primary Examiner* — Lail A Kleinman
(74) *Attorney, Agent, or Firm* — CANTOR COLBURN LLP

(57) ABSTRACT

A high-performance sports car having: a chassis; a bottom facing a ground; four wheels; four suspensions, each of which connects a corresponding wheel to the chassis, has a variable geometry, and is equipped with at least one actuator device adapted to modify the geometry of the suspensions; and a body which covers the chassis and is equipped with four wheel arches, each of which surrounds a corresponding wheel at the top. The chassis is provided inferiorly with a plurality of support feet which are adapted to rest on the ground to support the weight of the sports car. The actuator devices are configured to lift, only when the sports car is parked, the wheels upwards with respect to the chassis changing the geometry of the suspensions up to rest on the ground the support feet.

15 Claims, 8 Drawing Sheets

(56) References Cited

U.S. PATENT DOCUMENTS

| | | | |
|---|---|---|---|
| 9,126,568 B1* | 9/2015 | Reid, Jr. | ................... B60S 9/08 |
| 2010/0108966 A1 | 5/2010 | Deegan et al. | |
| 2011/0198137 A1* | 8/2011 | De Paschoal | ............ B60G 3/20 |
| | | | 280/124.135 |
| 2017/0120712 A1 | 5/2017 | Coombs et al. | |
| 2017/0210268 A1* | 7/2017 | Kangas | ................ B60G 17/017 |
| 2019/0009831 A1* | 1/2019 | Albertson | ............ B62D 35/008 |
| 2019/0389265 A1* | 12/2019 | Bartlett | ............... B66F 9/07559 |
| 2020/0016951 A1 | 1/2020 | Letizio et al. | |
| 2022/0024531 A1* | 1/2022 | Traut | ...................... B60S 9/205 |
| 2023/0038742 A1* | 2/2023 | Cervantes | ............ B60G 17/005 |

* cited by examiner

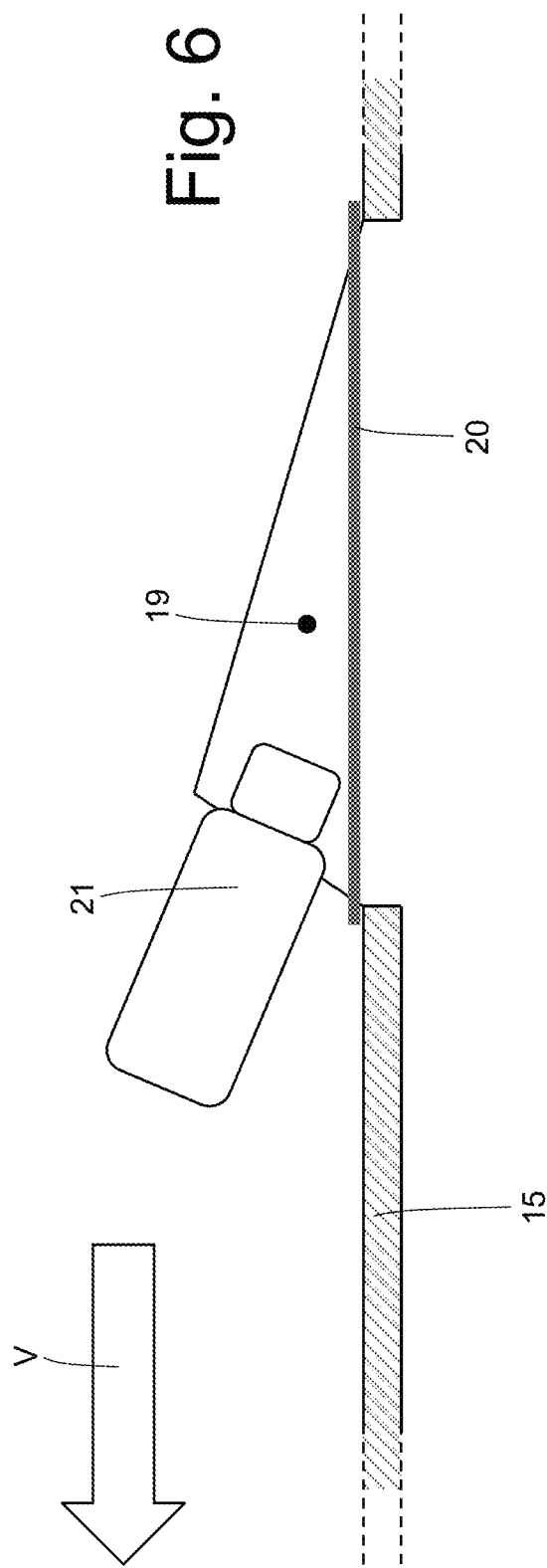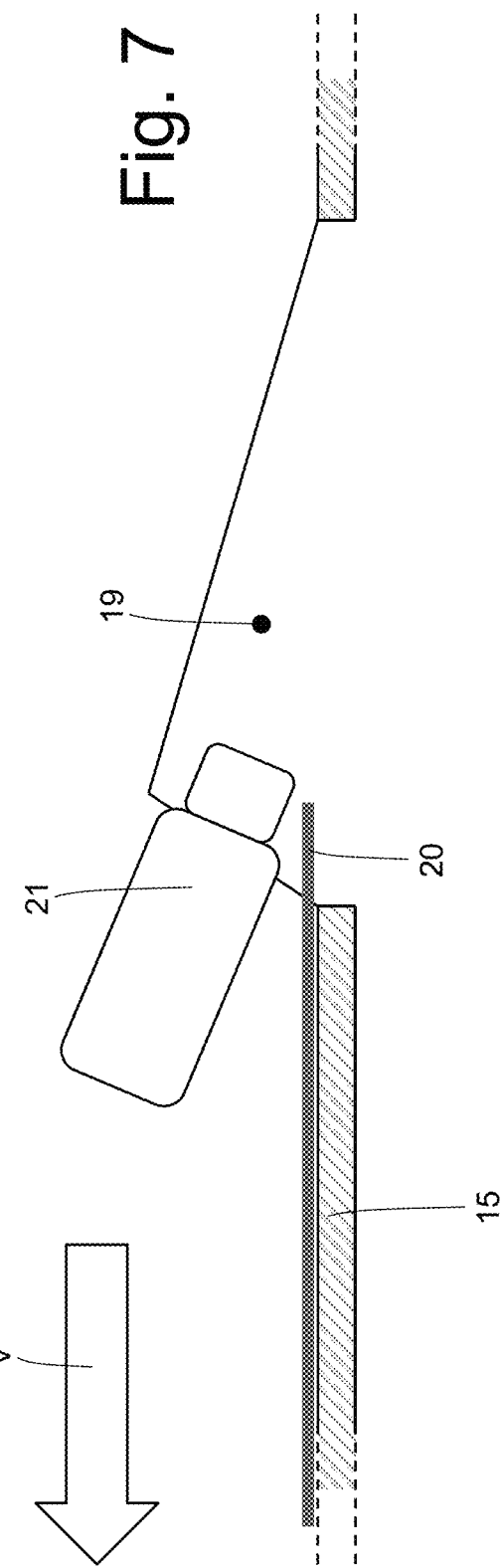

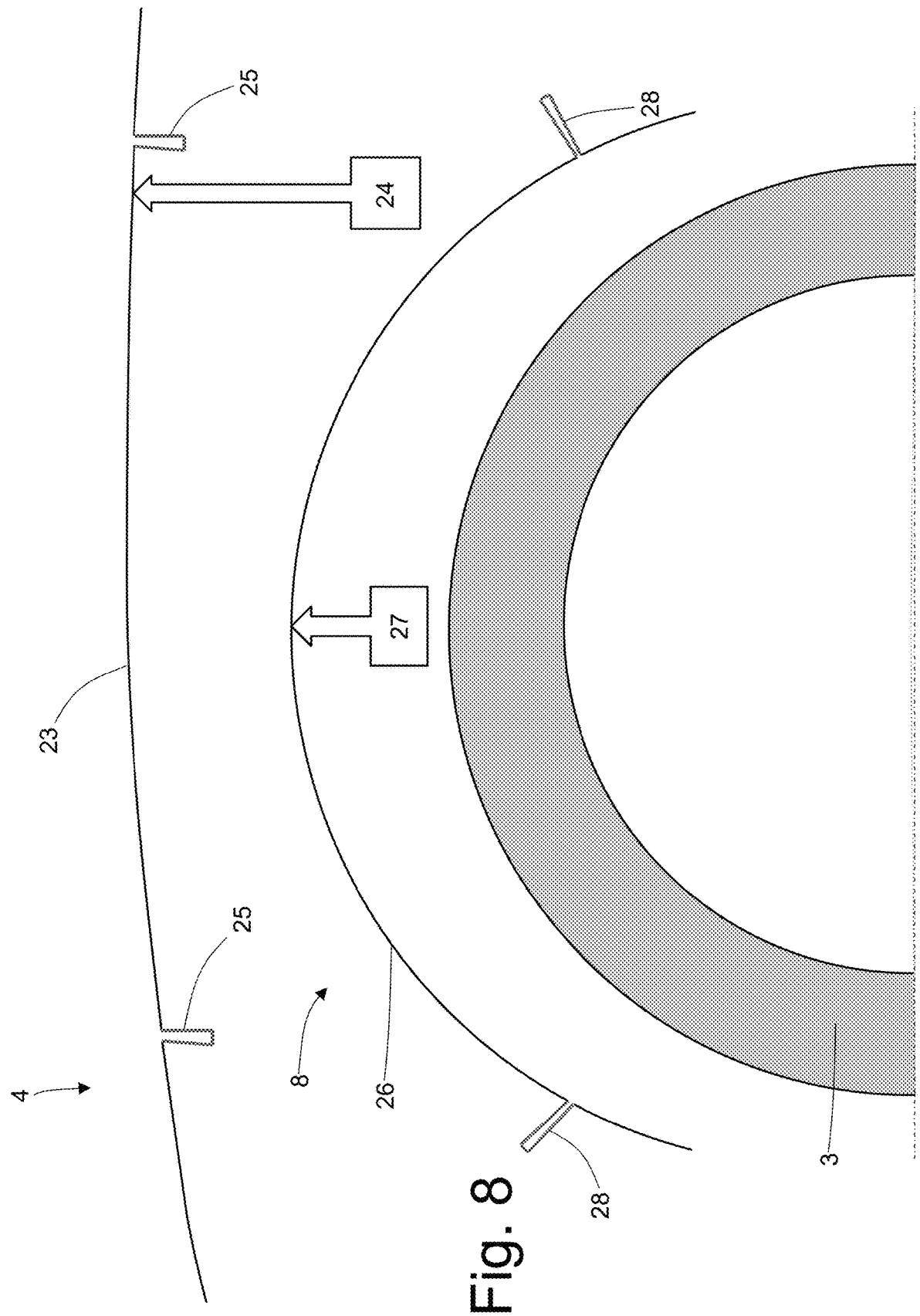

HIGH-PERFORMANCE SPORTS CAR AND CORRESPONDING CONTROL METHOD

CROSS-REFERENCE TO RELATED APPLICATIONS

This patent application claims priority from Italian patent application no. 102020000011707 filed on 20 May 2020, the entire disclosure of which is incorporated herein by reference.

TECHNICAL FIELD

The present invention relates to a high-performance sports car and a corresponding control method.

PRIOR ART

A high-performance sports car has a chassis which supports a pair of front wheels and a pair of rear wheels; between the front wheels and the rear wheels a passenger compartment is present which is accessed at least by means of a pair of doors, each of which is hinged to the chassis by means of a hinge for rotating about a rotation axis between an opening position and a closing position of the passenger compartment.

In the large majority of cars, the rotation axes of the hinges of the front doors are vertical and the hinges of the front doors are fixed to two respective vertical uprights of the chassis arranged in a rearward position with respect to the front wheels (i.e. at a certain distance from the wheel arches of the front wheels).

Such configuration of the hinges of the front doors ensures an excellent accessibility to the passenger compartment of the widely used cars present on the market.

However, such configuration of the hinges of the front doors does not allow obtaining a good accessibility to the passenger compartment of a high-performance sports car, particularly when the engine is arranged in central position.

In a high-performance sports car, it has been proposed to use for the front doors (actually the sole doors of the car) hinges having a horizontal rotation axis arranged longitudinally; in this case, the hinges are arranged in an upper position for forming the so-called "gull-wing" opening (such solution was used for example by Mercedes 300 SL produced in the years 1954-1957). In a high-performance sports car, it has also been proposed to use for the front doors (actually the sole doors of the car) hinges having a horizontal rotation axis arranged transversally; in this case, the hinges are arranged in a front position (such solution was used for example by Lamborghini Countach produced in the years 1973-1990).

However, none of the solutions proposed to date allow obtaining a good accessibility to the passenger compartment of a high-performance sports car, particularly when the engine is arranged in central position.

The patent application US2017120712A1 describes a stabilization system of a trailerable road vehicle (for example a trailer) wherein the weight of the vehicle is transferred from the wheels to a series of support feet progressively reducing the height from the ground of the wheels by means of the shortening of the fluid springs which connect the wheels to the chassis.

The patent application GB964964A describes a trailerable road vehicle (typically a semitrailer designed to be towed by a front tractor with which, by coupling, it forms a tractor trailer), wherein the weight of the vehicle is transferred from the wheels to a lower portion of the chassis progressively reducing the height from the ground of the wheels acting on the suspensions which connect the wheels to the chassis.

DESCRIPTION OF THE INVENTION

The object of the present invention is to provide a high-performance sports car and a corresponding control method, said car being devoid of the drawbacks described above and, simultaneously, being also easy and cost-effective to manufacture.

According to the present invention, a high-performance sports car is provided and a corresponding control method, as claimed in the appended claims.

The claims describe preferred embodiments of the present invention forming integral part of the present description.

BRIEF DESCRIPTION OF THE DRAWINGS

The present invention will now be described with reference to the accompanying drawings, which illustrate a non-limiting embodiment example thereof, wherein:

FIGS. 6 and 7 schematically illustrate a detail of the bottom of the car of FIG. 1 respectively in the driving configuration and in the parking configuration; and FIGS. 8 and 9 schematically illustrate a detail of a wheel arch and of the body of the car of FIG. 1 respectively in the driving configuration and in the parking configuration.

PREFERRED EMBODIMENTS OF THE INVENTION

Figure 1:
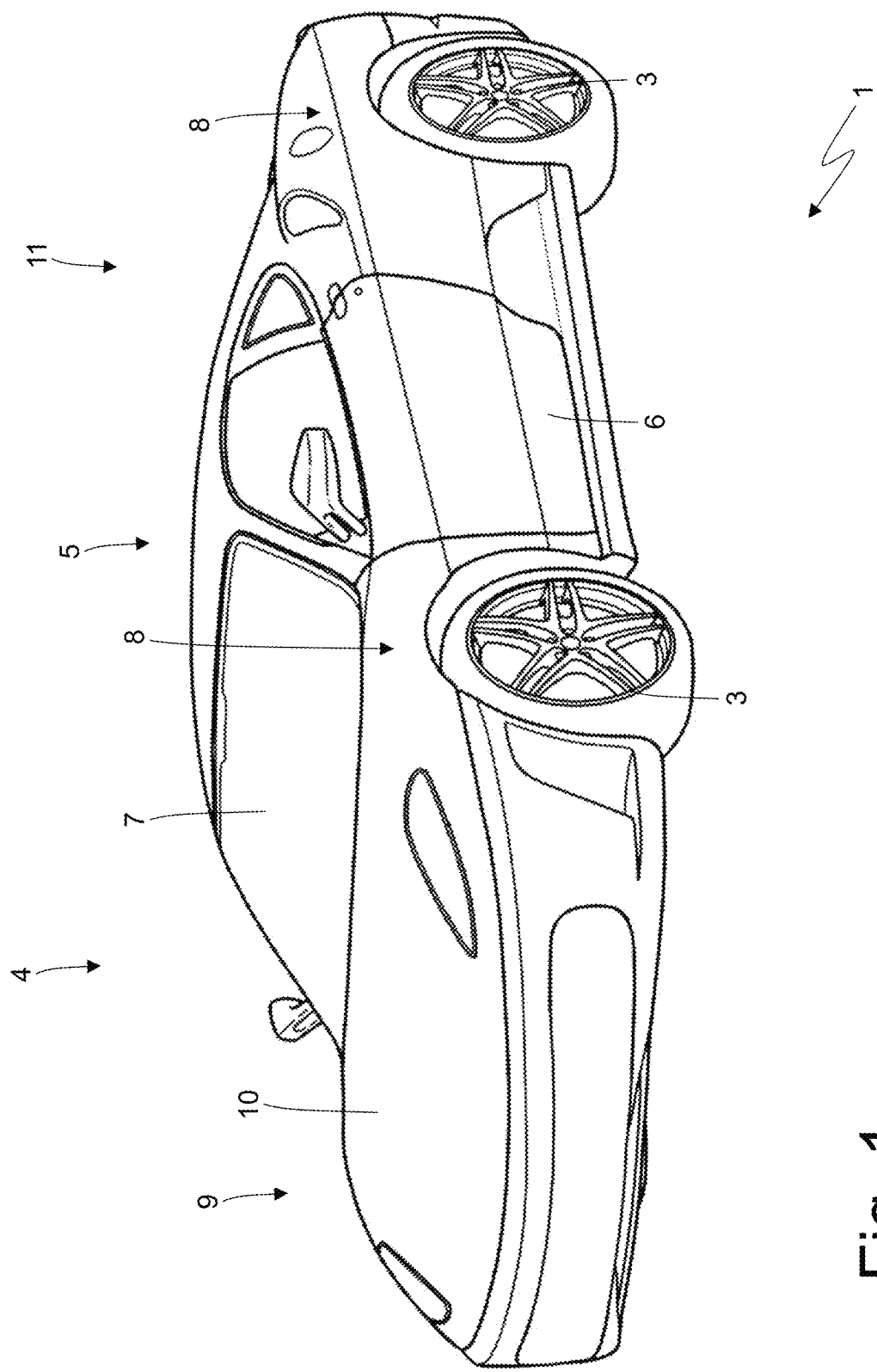
FIG. 1 is a perspective view of a car manufactured in accordance with the present invention and in a driving configuration.

In FIG. 1, reference numeral 1 indicates, as a whole, a car having a rear (or central) engine, said car comprising a chassis 2 (schematically illustrated in FIG. 2), which supports a pair of front steering wheels 3 and arranged in a front position and a pair of rear wheels 3 arranged in a rear position at a certain distance (called wheelbase or axle base) from the front wheels 3; i.e. the wheelbase, also called axle base, indicates the distance between the axis of a front wheel 3 and the axis of the rear wheel 3 placed on the same side and is a predominant (major) part of the entire length of the car 1. The engine (arranged in a rear or central position and schematically illustrated in FIG. 2) transmits the motion to the rear wheels 3 which in this embodiment are steering.

The chassis 2 is covered by a body 4 which constitutes the external case of the car 1 and centrally delimits a passenger compartment 5 present between the front wheels 3 and the rear wheels 3. In particular, the body 4 comprises a pair of doors 6 which allow the access to the passenger compartment 5 and comprises a windshield 7 which frontally delimits the passenger compartment 5. Inside the passenger compartment 5, a driver's seat is present equipped with, among other things, a steering wheel (schematically illustrated in FIG. 2) which allows varying a steering angle of the two front wheels 3.

Furthermore, the body 4 is equipped with four wheel arches 8, each of which surrounds a corresponding wheel 3 at the top.

In front of the passenger compartment 5 a front compartment 9 is present (for example, but not exclusively, for the luggage) which is closed at the top by a hinged front hood 10 (which is part of the body 4). Behind the passenger compartment 5 a rear engine compartment 11 is present (illustrated in FIG. 2) which is closed at the top by a hinged rear hood 12 (which is part of the body 4 and is illustrated in FIG. 3).

Figure 2:
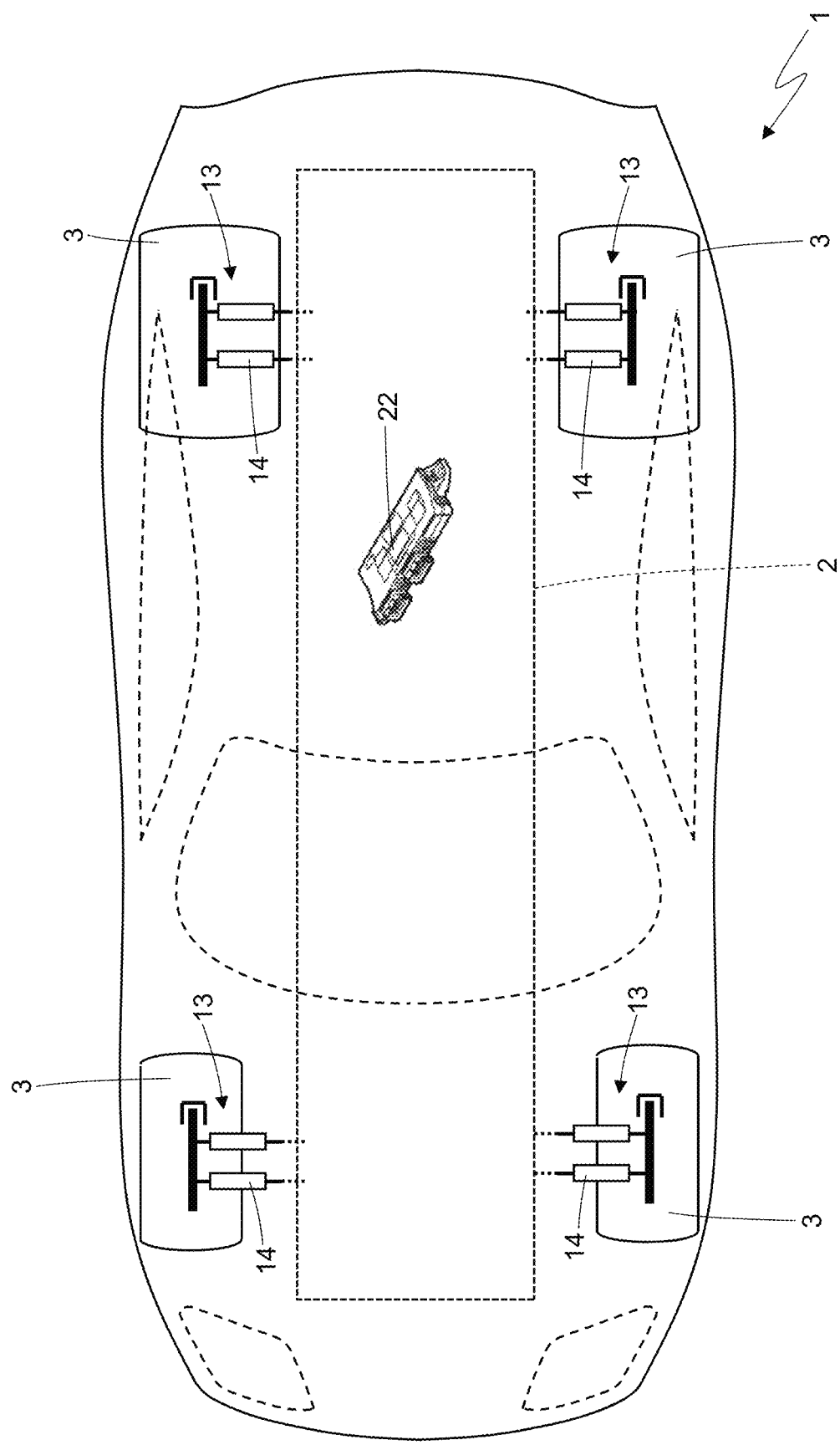
FIG. 2 is a schematic plan view of the car of FIG. 1.

According to what illustrated in FIG. 2, each front wheel 3 is mechanically connected to the chassis 2 by means of a front suspension 13 of "multi-link" type (according to a different embodiment the front suspension 13 is of "articulated quadrilateral" type); analogously, each rear wheel 3 is mechanically connected to the chassis 2 by means of a rear suspension 13 of "multi-link" type. Each suspension 13 comprises at least one actuator device 14 which is controllable for varying the geometry of the suspension 13 and in particular for modifying the height from the ground of the car 1, i.e. for modifying the vertical elevation of the wheels 3 with respect to the chassis 2.

Figure 3:
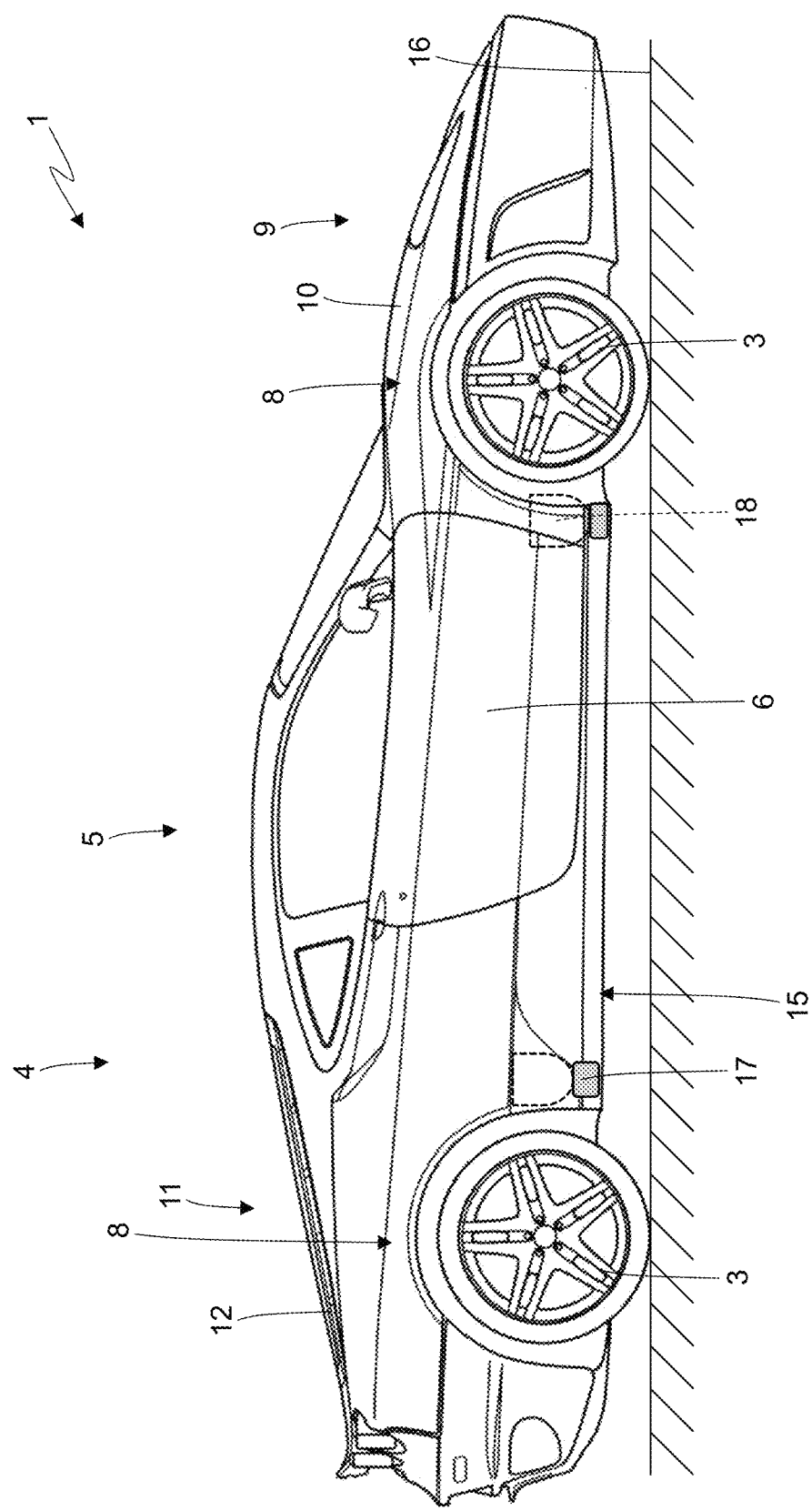
FIG. 3 is a side view of the car of FIG. 1 in the driving configuration.
Figure 4:
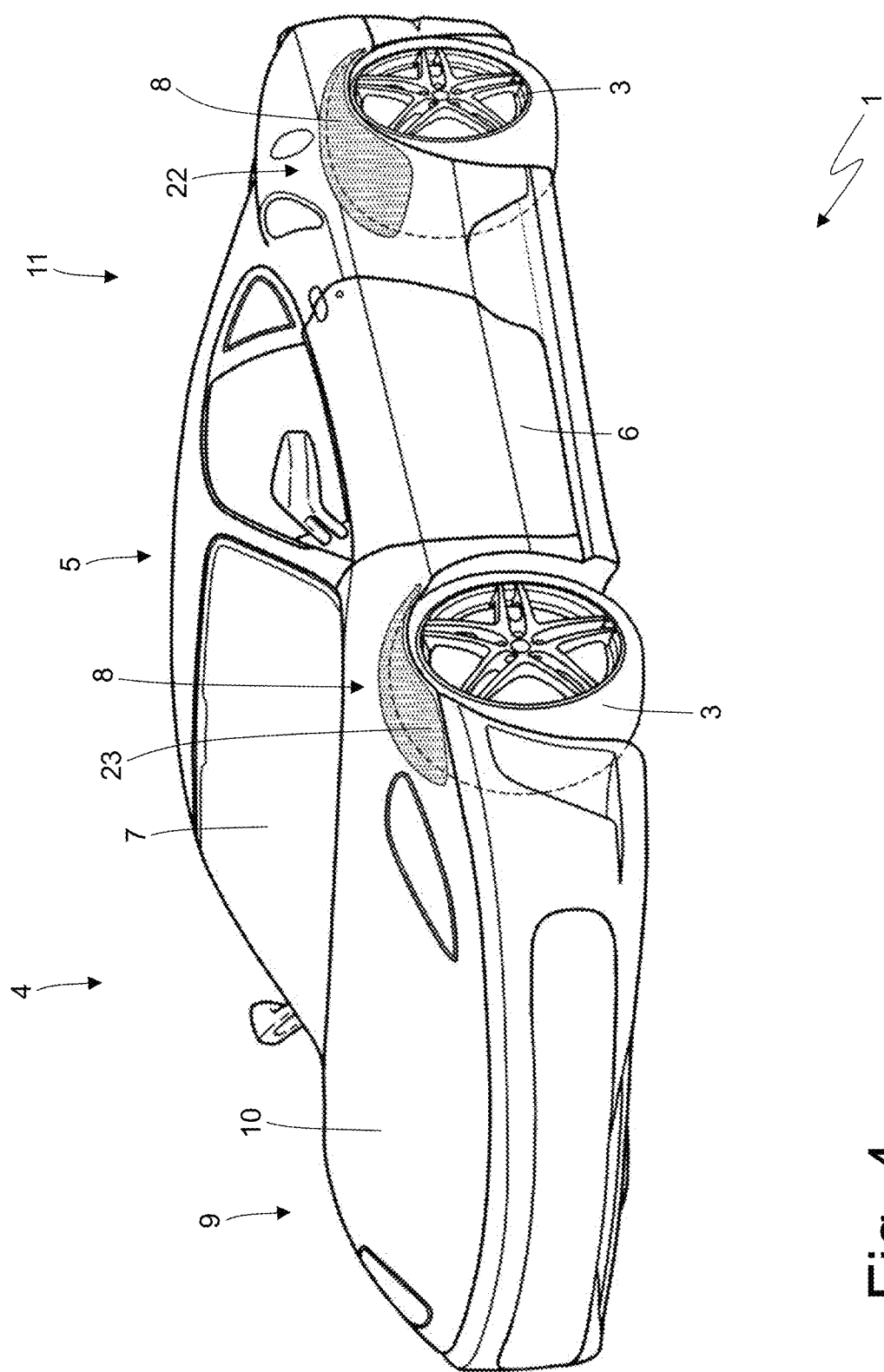
FIGS. 4 and 5 are respectively a perspective view and a side view of the car of FIG. 1 in a parking configuration.
Figure 5:
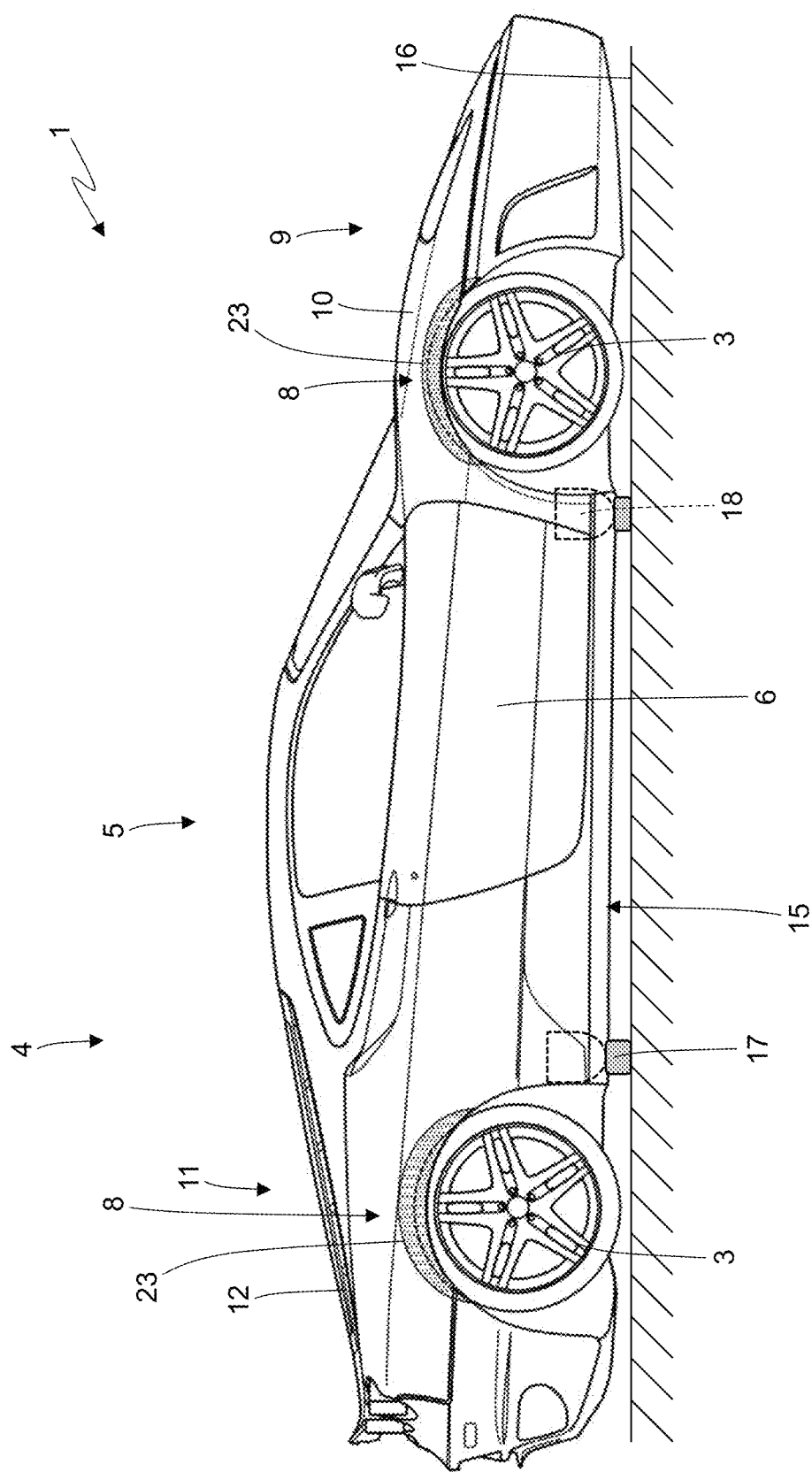

According to what illustrated in FIGS. 3 and 5, the car 1 has a bottom 15 which inferiorly delimits the car 1, faces a ground 16 on which the car 1 moves, and is normally shaped for obtaining an aerodynamic effect (for example is flat and is provided in the rear with an extractor which exploits the Venturi effect).

According to what illustrated in FIGS. 3 and 5, the chassis 2 is provided inferiorly with a plurality of support feet 17 (in particular four support feet 17 arranged between the wheels 3 and in proximity of the wheels 3) which are adapted to rest on the ground 16 for supporting the weight of the car 1. The support feet 17 are movable between a driving position (illustrated in FIG. 3) in which the support feet 17 are flush with the bottom 15 (i.e. a lower surface of each support foot 17 is connected in a seamless manner to the lower surface of the bottom 15) and a parking position (illustrated in FIG. 5) in which the support feet 17 protrude downwards from the bottom 15. In particular, four actuator devices 18 are provided, each of which is adapted to move, only when the car 1 is parked, a corresponding support foot 17 between the driving position (illustrated in FIG. 3) and the parking position (illustrated in FIG. 5).

According to a possible embodiment illustrated in FIGS. 6 and 7, through the bottom 15 a recess 19 is present which is closed by a movable flap 20 and houses a sensor 21 which is adapted to detect a conformation of the ground 16 below the bottom 15 for checking the presence of raised parts in the ground 16 (which could damage the bottom 15 in the parking position). Preferably, the sensor 21 is of optical type and comprises a video camera which frames the ground 16 below the bottom 15 and is oriented in a direction opposite to the travel direction V; i.e. the sensor 21 is arranged in a front position of the bottom 15 and faces backwards (i.e. towards the tail of the car 1) for framing from the front the ground 16 below the bottom 15. The function of the movable flap 20 is to protect the sensor 21 both from dust and water which are raised during the driving (which could dirty the optics preventing the sensor 21 from having a correct vision), and from possible debris which could be raised during the driving (which could damage the sensor 21).

The actuator devices 14 are configured to lift, only when the sports car 1 is parked, the wheels 3 upwards with respect to the chassis 2 changing the geometry of the suspensions 13 up to rest on the ground 16 the support feet 17 i.e. until the wheels 3 detach from the ground 16 (as illustrated in FIG. 5). In other words, the suspensions 13 and the actuator devices 14 are designed to impress on the wheels 3 a sufficiently long vertical travel such to detach the wheels 3 from the ground 16 (obviously only when the car 1 is parked) resting the car 1 on the ground 16 on the support feet 17 (as illustrated in FIG. 5).

The car 1 comprises a control unit 22 (schematically illustrated in FIG. 2) which is configured to control, only when the car 1 is parked, the actuator devices 14 so as to lift the wheels 3 upwards with respect to the chassis 2 up to rest on the ground 16 the support feet 17 i.e. until the wheels 3 detach from the ground 16. Obviously, before starting the lifting of the wheels 3 with respect to the chassis 2, the control unit 22 makes the support feet 17 come out of the driving position (illustrated in FIG. 3) to the parking position (illustrated in FIG. 5).

In particular, the control unit 22 allows lifting the wheels 3 upwards with respect to the chassis 2 only when the ground 16 below the bottom 15 does not have raised parts (the presence of which is checked by the sensor 21). Obviously, before allowing the car 1 to drive off, the control unit 22 lowers the wheels 3 with respect to the chassis 2 so as to rest the wheels 3 again on the ground 16 and thus retracts the support feet 17 from the parking position (illustrated in FIG. 5) to the driving position (illustrated in FIG. 3).

According to a preferred embodiment, the control unit 22 allows lifting the wheels 3 upwards with respect to the chassis 2 only when the doors 6 are closed and instantly locks any lifting/lowering of the wheels 3 with respect to the chassis 2 if a door 6 is opened.

Resting the car 1 on the ground by means of the support feet 17 (which have a modest thickness quantifiable for example in 1-2 centimeters) allows remarkably lowering (up to bringing the bottom 15 to come close to the ground 16) the passenger compartment 5 (of course only when the car 1 is parked); by exploiting a very low passenger compartment 5 when the car 1 is parked and consequently by suitably designing the conformation and the hinging of the doors 6, it is possible to obtain an excellent accessibility to the passenger compartment 5 both in getting in, and in getting out.

Figure 9:
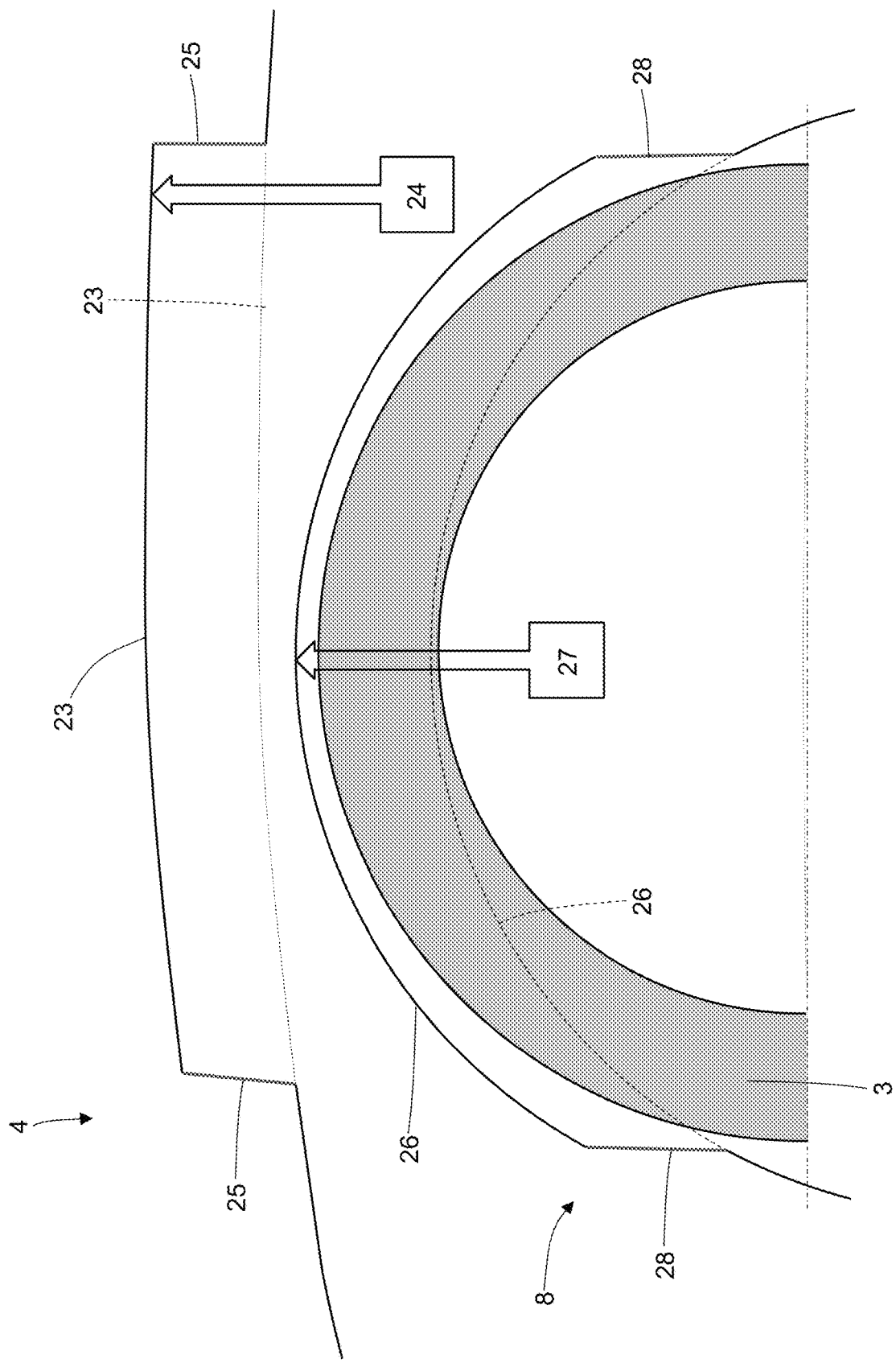

According to a possible embodiment illustrated in FIGS. 8 and 9, the body 4 comprises, in correspondence with the wheels 3 or in correspondence with at least part of the wheels 3 (for example only for the front wheels 3 or only for the rear wheels 3), movable panels 23 (only one of which is illustrated in FIGS. 8 and 9). Each movable panel 23 (which is not structural and thus is not part of the chassis 2) is arranged in correspondence with a single and sole wheel 3 (i.e. involves only one wheel 3), is above the single and sole wheel 3 and is vertically movable with respect to the chassis 2 between a lowered position (illustrated in FIG. 8) which is always assumed while driving and a raised position (illustrated in FIG. 9) which is assumed only when the car 1 is parked for allowing the lifting of the wheel 3 with respect to the chassis 2 (i.e. for creating free space above the wheel 3 and which the wheel 3 occupies during its lifting).

For each movable panel 23 an actuator device 24 is provided which is adapted to move the movable panel 23 between the lowered position (illustrated in FIG. 8) and the raised position (illustrated in FIG. 9).

Preferably, the body 4 comprises at least one elastically deformable portion 25 which connects each movable panel 23 to the rest of the body 4 and elastically deforms to allow the movable panel 23 moving between the lowered position (illustrated in FIG. 8) and the raised position (illustrated in FIG. 9). For example, the deformable portion 25 could be composed of a waterproof fabric and having a suitable surface finishing in the external part (which is fully exposed in the raised position). According to a possible embodiment, each movable panel 23 could be partially or completely made of elastically deformable material (i.e. could be devoid of rigid parts).

According to a possible embodiment illustrated in FIGS. 8 and 9, the wheel arches 8 or at least part of the wheel arches 8 (for example only the front wheel arches 8 or only the rear wheel arches 8) comprise respective movable panels 26 (only one of which is illustrated in FIGS. 8 and 9). Each movable panel 26 (which is not structural and thus is not part of the chassis 2) is part of a wheel arch 8, is arranged below a corresponding movable panel 23 (if present), and is vertically movable with respect to the chassis 2 and synchronized with the corresponding movable panel 23 (if present) between a lowered position (illustrated in FIG. 8) which is always assumed while driving and a raised position which is assumed only when the car 1 is parked (illustrated in FIG. 8). I.e. each movable panel 26 (just as each movable panel 23) is arranged in correspondence with a single and sole wheel 3 (i.e. involves only one wheel 3) and is above the single and sole wheel 3.

For each movable panel 26 an actuator device 27 is provided which is adapted to move the movable panel 26 between the lowered position (illustrated in FIG. 8) and the raised position (illustrated in FIG. 9). In a same wheel 3, the actuator device 27 could have parts in common with the actuator device 24: for example, the two actuator devices 24 and 27 could share a common source of motion which generates a movement which is transmitted to the two movable panels 23 and 26 by means of corresponding mechanical transmissions.

The actuator devices 24 and 27 (which act on the movable panels 23 and 26) are completely separate from and independent of the actuator devices 14 (which act in the suspensions 13) are adapted to move the respective movable panels 23 and 26 with respect to the chassis 2 between the lowered position and the raised position with a movement totally autonomous from a movement of the wheels 3 with respect to the chassis 2 (i.e. from an internal movement of the suspensions 13).

Preferably, at least one elastically deformable portion 28 is provided which connects each movable panel 26 to the rest of the wheel arch 8 and elastically deforms to allow the movable panel 26 moving between the lowered position (illustrated in FIG. 8) and the raised position (illustrated in FIG. 9). For example, the deformable portion 28 could be composed of a waterproof fabric. According to a possible embodiment, each movable panel 26 could be partially or completely made of elastically deformable material (i.e. could be devoid of rigid parts).

As said in the foregoing, four movable panels 23 and four movable panels 26 could be provided, or two movable panels 23 (in front position or in rear position) and two movable panels 26 (in front position or in rear position), only two or four movable panels 23 (i.e. no movable panel 26), only two or four movable panels 26 (i.e. no movable panel 23), two movable panels 23 (in front position or in rear position) and four movable panels 26, or two movable panels 26 (in front position or in rear position) and four movable panels 23. Alternatively, the movable panels 23 and 26 could be totally absent.

The presence, the number and the position of the movable panels 23 and 26 depends on the conformation of the body 4 and of the wheel arches 8 and on the overall vertical travel of the wheels 3 with respect to the chassis 2, i.e. depends on the fact that, in the absence of the movable panels 23 and 26, the wheels 3 lifting vertically with respect to the chassis 2 beat or do not beat against the wheel arches 8 or against the body 4.

The embodiments described herein can be combined with each other without departing from the scope of protection of the present invention.

The car 1 described above has numerous advantages.

Firstly and as said in the foregoing, by exploiting a very low passenger compartment 5 when the car 1 is parked and consequently by suitably designing the conformation and the hinging of the doors 6, it is possible to obtain an excellent accessibility to the passenger compartment 5 both in getting in, and in getting out.

Furthermore, when the car 1 is parked the wheels 3 are lifted off the ground 16 and thus are not deformed by the weight of the car 1 and do not risk ovalizing in case of prolonged stop (in fact it is frequent that a high-performance sports car is relatively not much used and thus remains parked in the same position for a long time).

When the car 1 is parked the wheels 3 are lifted off the ground 16 and thus can be dismounted and remounted easily; a change of tires during the use on track (not infrequent for a high-performance sports car) is thus extremely facilitated not having to lift the car 1 with external lifts.

Finally, the car 1 described above is relatively simple and cost-effective to manufacture since the suspensions 13 having a variable geometry and the corresponding actuator devices 14 are already present in a high-performance sports car and thus it is necessary to add only the support feet 17 (if there is suitable space between the wheels 8 and the wheel arches 8).

LIST OF THE REFERENCE NUMERALS OF THE FIGS 1 car
2 chassis
3 wheels
4 body
5 passenger compartment
6 doors
7 windshield
8 wheel arch
9 front compartment
10 front hood
11 rear engine compartment
12 rear hood
13 suspension
14 actuator device
15 bottom
16 ground
17 support feet
18 actuator device
19 recess
20 flap
21 sensor
22 control unit
23 movable panel
24 actuator device
25 deformable portion
26 movable panel
27 actuator device
28 deformable portion
V travel direction

The invention claimed is:

1. A high-performance sports car (1) comprising: a chassis (2); a bottom (15) facing a ground (16) on which the sports car (1) moves; two front steering wheels (3) supported by the chassis (2) and arranged in a front position; two rear wheels (3) supported by the chassis (2) and arranged in a rear position at a certain distance from the front wheels (3); an engine which transmits the motion to driving wheels (3); a passenger compartment (5) present between the front wheels (3) and the rear wheels (3); a steering wheel which is arranged in the passenger compartment (5) and adjusts a steering angle of the two front steering wheels (3); four suspensions (13), each of which connects a corresponding wheel (3) to the chassis (2), has a variable geometry, and is equipped with at least a first actuator device (14) adapted to modify the geometry of the suspensions (13); and a body (4) which covers the chassis (2) and is equipped with four wheel arches (8), each of which surrounds a corresponding wheel (3) at the top; wherein the chassis (2) is provided inferiorly with a plurality of support feet (17) which are adapted to rest on the ground (16) to support the weight of the sports car (1); wherein the first actuator devices (14) are configured to lift, only when the sports car (1) is parked, the wheels (3) upwards with respect to the chassis (2) changing the geometry of the suspensions (13) up to rest on the ground (16) the support feet (17), wherein a sensor (21) is provided which is adapted to detect a conformation of the ground (16) below the bottom (15) to check the presence of raised parts in the ground (16); and wherein a control unit (22) is provided which is configured to lift, only when the sports car (1) is parked, the wheels (3) upwards with respect to the chassis (2) only when the ground (16) below the bottom (15) has no raised parts.

2. The sports car (1) according to claim 1, wherein the support feet (17) are movable between a driving position in which the support feet (17) are flush with the bottom (15) and a parking position in which the support feet (17) protrude downwards from the bottom (15).

3. The sports car (1) according to claim 2 and comprising a plurality of second actuator devices (18), each of which is capable of moving, only when the sports car (1) is parked, a corresponding support foot (17) between the driving position and the parking position.

4. The sports car (1) according to claim 1, wherein the sensor (21) is of the optical type and comprises a video camera which is arranged in a recess (19) present in the bottom (15) and is oriented in a direction opposite to a forward travel direction (V) of the sports car (1).

5. The sports car (1) according to claim 4, wherein the recess (19) is protected by a normally closed flap (20) which opens only when the sports car (1) is parked.

6. The sports car (1) according to claim 1 and comprising: at least a first movable panel (23; 26) which is not structural and thus is not part of the chassis (2), is arranged in correspondence with a single and sole wheel (3), and is vertically movable with respect to the chassis (2) between a lowered position which is always assumed while driving and a raised position which is assumed only when the sports car (1) is parked; and at least a third actuator device (24; 27) which is completely separate from and independent of the first actuator devices (14) and is adapted to move the first movable panel (23; 26) with respect to the chassis (2) between the lowered position and the raised position with a movement totally autonomous from a movement of the wheels (3) with respect to the chassis (2).

7. The sports car (1) according to claim 6, wherein the first movable panel (23) is part of the body (4).

8. The sports car (1) according to claim 7 and comprising at least an elastically deformable portion (25) which connects the first movable panel (23) to the rest of the body (4) and elastically deforms to allow the first movable panel (23) moving between the lowered position and the raised position.

9. The sports car (1) according to claim 6, wherein the first movable panel (26) is part of a wheel arch (8).

10. The sports car (1) according to claim 6, wherein: the first movable panel (23) is part of the body (4); and at least a second movable panel (26) is provided which is part of a wheel arch (8), is arranged below the first movable panel (23), and is movable vertically and synchronized with the first movable panel (23) between a lowered position which is always assumed while driving and a raised position which is only assumed when the sports car (1) is parked.

11. A high-performance sports car (1) comprising: a chassis (2); a bottom (15) facing a ground (16) on which the sports car (1) moves; two front steering wheels (3) supported by the chassis (2) and arranged in a front position; two rear wheels (3) supported by the chassis (2) and arranged in a rear position at a certain distance from the front wheels (3); an engine that transmits the motion to driving wheels (3); a passenger compartment (5) present between the front wheels (3) and the rear wheels (3); a steering wheel which is arranged in the passenger compartment (5) and adjusts a steering angle of the two front steering wheels (3); four suspensions (13), each of which connects a corresponding wheel (3) to the chassis (2), has a variable geometry, and is equipped with at least a first actuator device (14) adapted to modify the geometry of the suspensions (13); and a body (4) which covers the chassis (2) and is equipped with four wheel arches (8), each of which surrounds a corresponding wheel (3) at the top; wherein the chassis (2) is provided inferiorly with a plurality of support feet (17) which are adapted to rest on the ground (16) to support the weight of the sports car (1); wherein the first actuator devices (14) are configured to lift, only when the sports car (1) is parked, the wheels (3) upwards with respect to the chassis (2) changing the geometry of the suspensions (13) up to rest on the ground (16) the support feet (17); wherein at least a first movable panel (23; 26) is provided which is not structural and thus is not part of the chassis (2), is arranged in correspondence with a single and sole wheel (3) and is vertically movable with respect to the chassis (2) between a lowered position which is always assumed while driving and a raised position which is assumed only when the sports car (1) is parked; and wherein at least a second actuator device (24; 27) is provided which is completely separate from and independent of the first actuator devices (14) and is adapted to move the first movable panel (23; 26) with respect to the chassis (2) between the lowered position and the raised position with a movement totally autonomous from a movement of the wheels (3) with respect to the chassis (2).

12. The sports car (1) according to claim 11, wherein the first movable panel (23) is part of the body (4).

13. The sports car (1) according to claim 12 and comprising at least an elastically deformable portion (25) which connects the first movable panel (23) to the rest of the body (4) and elastically deforms to allow the first movable panel (23) moving between the lowered position and the raised position.

14. The sports car (1) according to claim 11, wherein the first movable panel (26) is part of a wheel arch (8).

15. The sports car (1) according to claim 11 wherein: the first movable panel (23) is part of the body (4); and at least a second movable panel (26) is provided which is part of a wheel arch (8), is arranged below the first movable panel (23), and is movable vertically and synchronized with the first movable panel (23) between a lowered position which is always assumed while driving and a raised position which is only assumed when the sports car (1) is parked.

* * * * *